United States Patent Office 3,517,561
Patented June 30, 1970

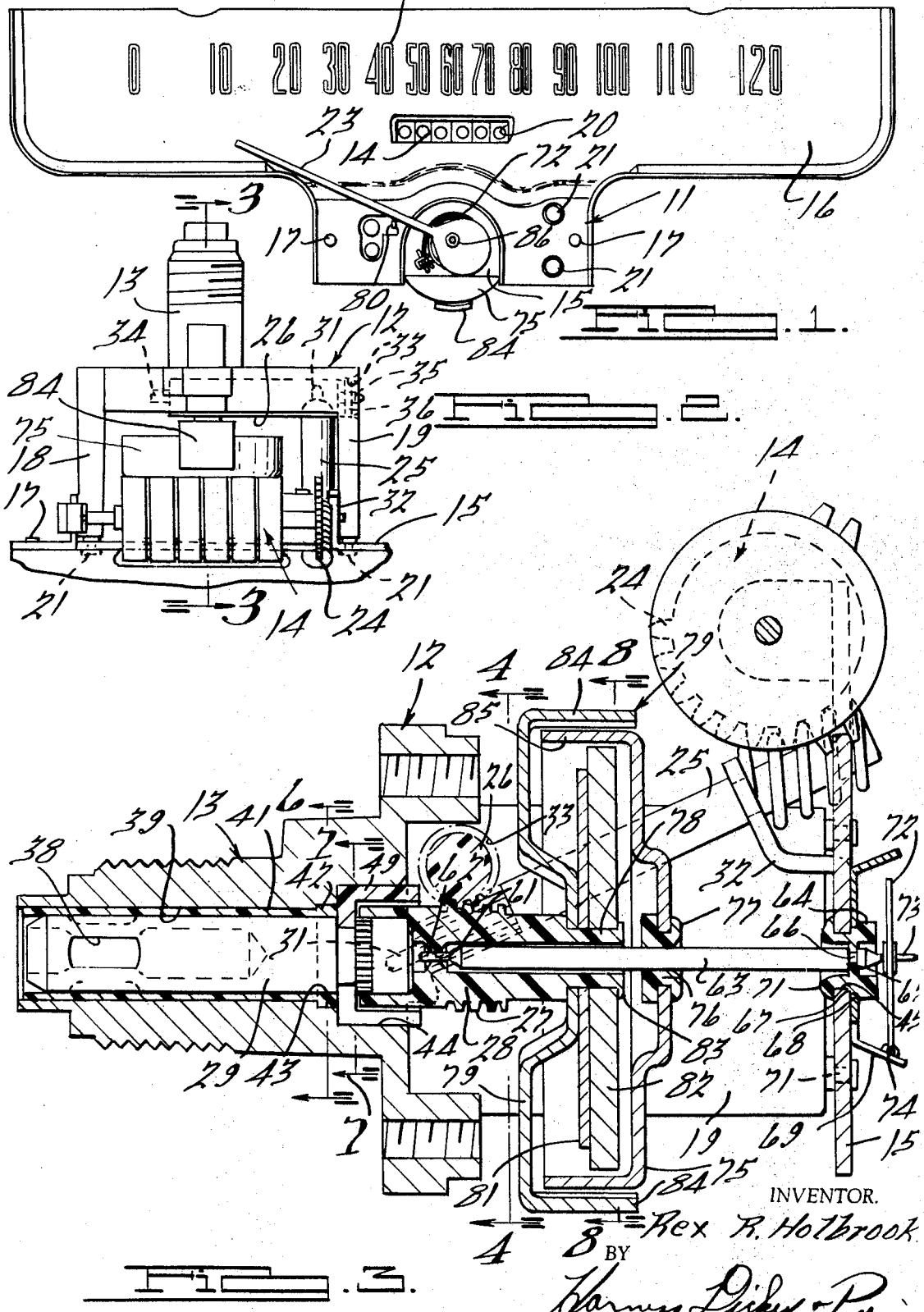

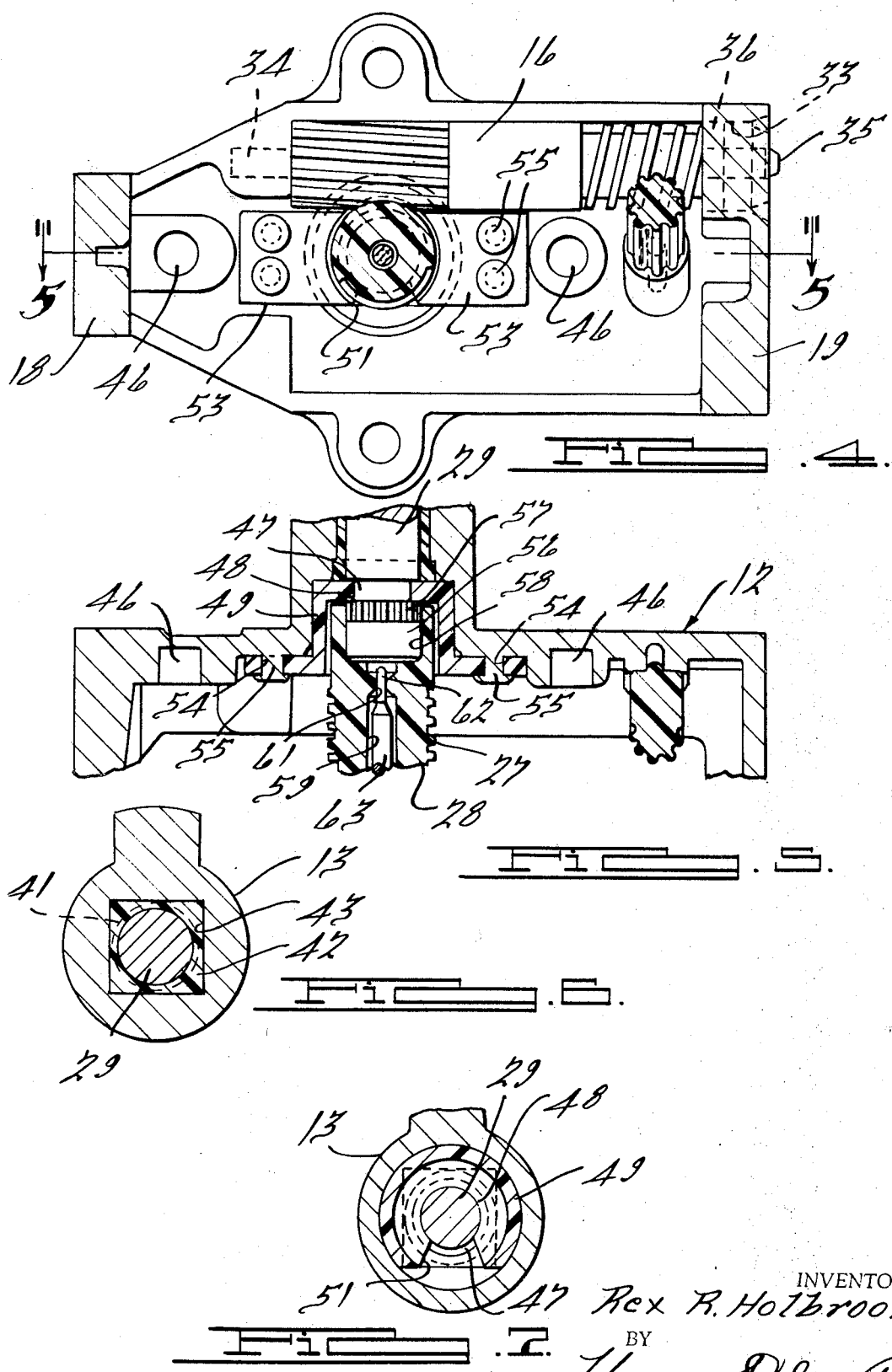

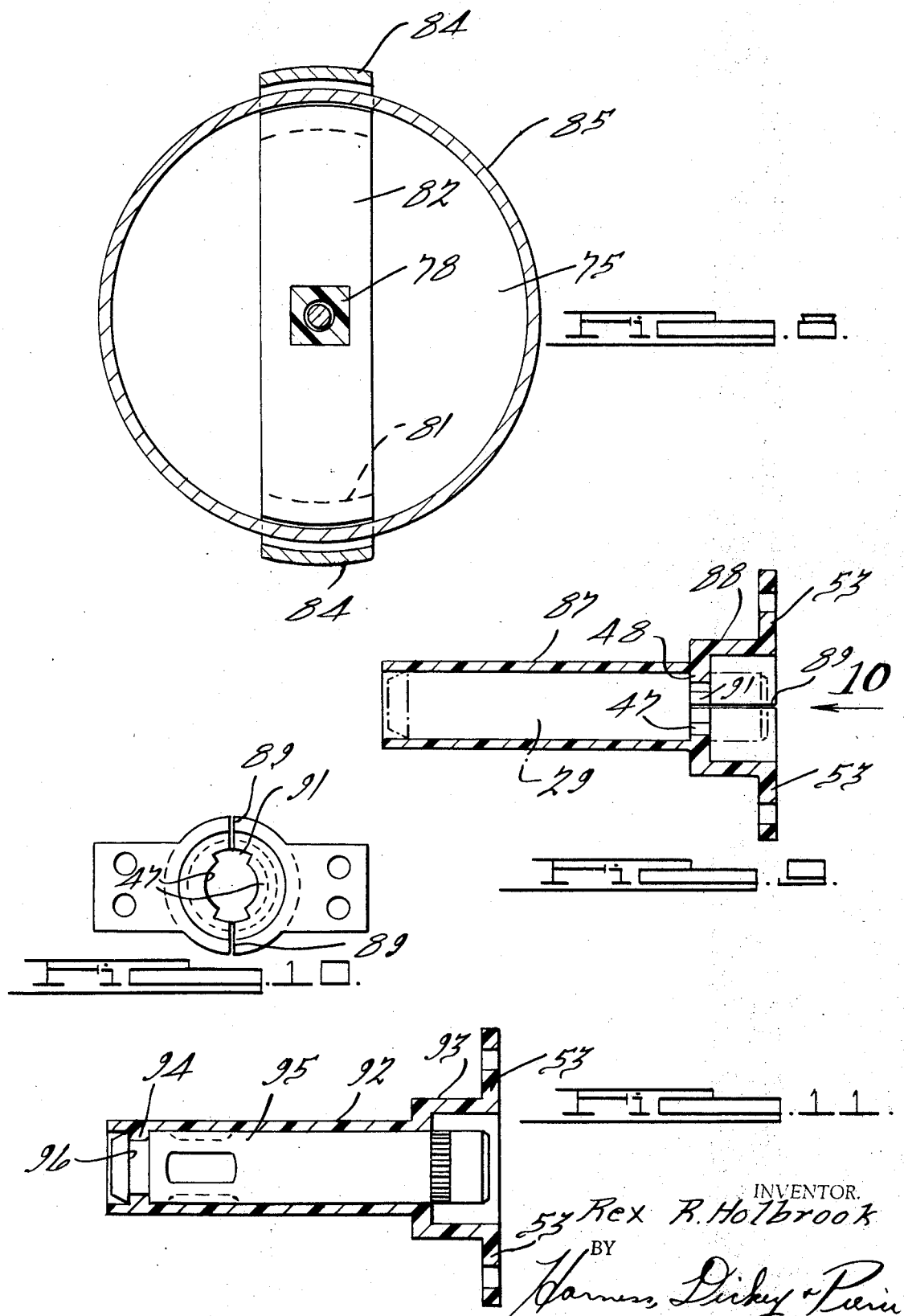

3,517,561
SPEEDOMETER MECHANISM
Rex R. Holbrook, Ann Arbor, Mich., assignor, by mesne assignments, to Chrysler Corporation, Highland Park, Mich., a corporation of Delaware
Filed May 16, 1967, Ser. No. 638,805
Int. Cl. G01p 3/49
U.S. Cl. 73—519                                              14 Claims

ABSTRACT OF THE DISCLOSURE

An in-line speedometer construction including concentrically molded shaft aligning means maintaining the drive shaft and the pointer staff in concentric in-line relation and also featuring shaft retaining means maintaining one end of the drive shaft and one end of the pointer staff fixed against relative endwise movement for single point end play control thereof.

BACKGROUND AND SUMMARY OF THE INVENTION

This invention relates to mechanisms for converting rotational speed to a signal and particularly to a coupling and/or support arrangement between the driving portion and the driven portion of a vehicle speedometer and more particularly to speedometers of the type having an in-line relation between the driving end of the speedometer cable and the indicating needle shaft.

The invention, in a specific embodiment, pertains to a device for indicating speed at any instance while driving and to record the distance a vehicle traveled. To provide a simple, positive and compact unit, the drive shaft operates a magnet assembly secured to the end of the drive shaft. The driven shaft supports a speed disc or cup which is magnetically coupled with the magnet assembly by disposing the peripheral wall of the speed cup adjacent to the magnet ends. The rotating field generated by the rotation of the magnet assembly causes the cup to turn against the tension of a spring, thus driving an indicator through a distance or angle which is a function of the speed of rotation of the magnet assembly. When the magnet is not rotating, the spring returns to cup and the indicator on the driven shaft to its zero position. The frame of the speedometer supports the index face as well as an odometer assembly including suitable indicia visible through a window in the face.

One type of in-line construction is illustrated in a patent to Helgeby, Pat. No. 3,073,978. In assembling speedometers of the type described above, and particularly in a unit wherein the driving end of the speedometer cable is supported in an in-line relation to the needle shaft, particular care must be exercised to insure that the driving portion of the cable is exactly concentric with the driven portion of the speedometer to alleviate any needle waiver. In accordance with one aspect of the invention, the manufacture of the connecting and support member between the two above drive and driven portions including a concentric molding process and by utilizing this feature of the present invention exact concentricity between these two portions is provided and the problems of the heretofore utilized methods of obtaining alignment are eliminated.

Also, in instruments of the type having a mechanism driven by a wire or cable within a sheath where one or both of the cable and sheath is formed as a spiral, a problem exists that any foreign material in the sheath may be pumped into the instrument by the relative rotation between the cable and sheath. Certain other features of the present invention provide an effective seal to block the flow of any foreign material into the instrument.

Accordingly, it is one object of the present invention to improve the manufacturing procedures of instruments of the type described.

It is another object of the present invention to provide a means for insuring the concentricity of two elements arranged in an in-line relation.

It is still another object of the present invention to eliminate needle wobble in a speedometer by improving the coupling between the driving and driven elements of the assembly.

It is still a further object of the present invention to improve the sealing characteristics of the connection between a spiral wound cable assembly and the assembly connected thereto.

It is still another object of the present invention to provide an improved support assembly for the driving shaft of an instrument of the type described.

Other objects and features of the present invention may be appreciated from a consideration of the following description taken in consideration with the accompanying drawings.

BRIEF DESCRIPTION OF THE DRAWINGS

FIG. 1 is a view in elevation of a speedometer and a panel from which the speed and the distance traveled are read;

FIG. 2 is an enlarged, broken plan view of the structure illustrated in FIG. 1;

FIG. 3 is an enlarged sectional view of the structure illustrated in FIG. 2, taken on the line 3—3 thereof;

FIG. 4 is an enlarged sectional view of the structure illustrated in FIG. 3, taken on the line 4—4 thereof;

FIG. 5 is a sectional view of the structure illustrated in FIG. 4, taken on the line 5—5 thereof;

FIG. 6 is a sectional view of the structure illustrated in FIG. 3, taken on the line 6—6 thereof;

FIG. 7 is a sectional view of the structure illustrated in FIG. 3, taken on the line 7—7 thereof;

FIG. 8 is a sectional view of the structure illustrated in FIG. 3, taken on the line 8—8 thereof;

FIG. 9 is a sectional view of a bearing sleeve, similar to that at the left-hand end of the structure of FIG. 3, showing another form thereof;

FIG. 10 is an end view of the structure illustrated in FIG. 9, as viewed from the point 10 thereof; and FIG. 11 is a view of structure, similar to that illustrated in FIG. 9, showing another form of bearing sleeve.

DESCRIPTION OF THE PREFERRED EMBODIMENTS

Referring more particularly to FIGS. 1 to 8, the odometer and speedometer device 11 comprises a U-shaped frame 12 having a threaded projection 13 which is connectable to the end of a conduit guided drive cable (not shown) of a vehicle or other device, the speed of which is to be indicated. An odometer 14 is supported on a stamping 15 to which a speedometer dial plate 16 is secured by rivets 17. Extending arms 18 and 19 of the frame 12 has pinlike extensions 21 on the ends which project into apertures in the stamping 15. The pins 21 are headed to retain the stamping fixed to the ends of the arms 18 and 19, as clearly illustrated in FIG. 2. The dial plate has a window 20 through which the odometer 14 is read and is provided with speedometer idicium 22 by which the speed of the vehicle is indicated by a pointer 23.

The odometer 14 is driven by a stamped gear 24 from worm and worm wheel gear elements 25 and 26 from a worm 27 on a sleeve 28 made of plastic material and secured to the end of a drive shaft 29. The gear element 25 has an end 31 extending in an aperture in the frame 12, the opposite end being secured in a bifurcated end of a cutout arm 32 from the stamping 15, as clearly illustrated in FIG. 3. The gear element 26 is mounted through an aperture 33 in the base portion of the frame 12 has an end 34 journaled in an aperture in the frame and an opposite end 35 journaled in a sleeve bearing 36 which is staked or otherwise secured within the end of the aperture 33.

The drive shaft 29 has a square central aperture produced by offsetting four areas 38 inwardly in the wall of a hollow end portion from the outer periphery thereof. An aperture 39 is provided through the threaded projection 13 of the frame 12 for receiving a bearing sleeve 41 of suitable plastic material such as Delrin. The sleeve has a square top flange 42 which fits within a square recess 43 at the inner end of the aperture 39 beyond which an enlarged cylindrical recess 44 is provided. After the sleeve 41 is inserted within the aperture 39 and the flange 42 is seated within the square recess 43 it is prevented from turning. The aperture of the bearing sleeve 41 is accurately reamed to have its center located centrally of an aperture 45 in the stamping 15. The reaming process is performed while the sleeve 41 is within the projection 13 and the sleeve 41 is seen to be of thin construction. Thus, the conduction of heat to the exterior of the mechanism is enhanced to eliminate warpage of the sleeve 41 and the tube may be machined with a greater degree of accuracy than heretofore known. A pair of apertures 46 are provided in the base of the frame 12 for locating the reamer guide to accurately locate the center of the bearing sleeve 41 relative to the pins 21 on the arms 18 and 19. The reaming operation thins the wall of the sleeve and thus prevents the building up of heat due to the rotation of the drive shaft 29.

The drive shaft 29 has an annular recess 47 in which a split flange 48 of a cap 49 made of plastic material extends to prevent the endwise movement of the shaft. The cap has a cylindrical wall which supports the radially inwardly extending flange, which has a cutout section 51 to permit the flange to be flexed into the recess 47. As illustrated in FIG. 4, the cap has a pair of aligned flanges or ears 53 containing a pair of apertures 54 which receive pin-like projections 55 extending upwardly from the base portion of the frame 12 which projections are headed to secure the cap within the recess 44. The inner end 56 of the drive shaft 29 has a light knurl 57 which has driving engagement with the inner wall of an aperture 58 in the adjacent end of the sleeve 28. The aperture 58 is accurately centered with an aperture 59 at the other end of the sleeve 28 with an aperture 61 of small diameter disposed therebetween. The aperture 61 is utilized to rotatably support an end 62 of a needle shaft 63.

As stated above, it is necessary to accurately locate the surface defined by the outside diameter of the drive end 56 of the drive shaft 29 exactly concentrically with the surface defined by the outside diameter of the end 62 of the needle shaft 63. Accordingly, the apertures 58 and 61 must, of necessity, be accurately concentric in order to achieve the concentricity between the ends 56 and 62. The manufacture of the sleeve 28 is accomplished by a molding process which permits extreme accuracy in positioning the surface forming aperture 58 relative to the surface forming aperture 61.

A plastic sleeve 64 has an inwardly extending flange 65 which extends within an annular recess 66 at the outer end of the shaft 63 to prevent its endwise movement. The sleeve 64 has a shoulder 67 which rests upon the top of the stamping 15 when inserted through the aperture 45 and a second shoulder 68 which retains a spring adjusting and supporting member 69 for rotation relative thereto. The sleeve 64 is secured to the stamping 15 when its end is swaged at 71 over the undersurface of the stamping. A spiral spring 72 has an inner end fixed to an extending pointer supporting end 73 and the outer end secured at 74 to the member 69. The tension of the spring may be changed by the rotation of the member 69 about the sleeve 64.

A speed cup 75 is fixed to the shaft 63 by a flanged plastic sleeve 76 which is staked over the cup at 77. The sleeve 28 has a square end 78 which receives a square aperture in the center of a flux collector 79. After the collector has been placed over the end 78, a square hole formed in a temperature compensator 81 is placed thereover. Thereafter, a square aperture formed in the center of a magnet 82 is placed over the end 78 and secured in firm fixed relation to the compensator 81 and collector 79 by flanging the end of the sleeve 28 thereover as at 83. It will be noted in this arrangement that gaps are formed between the ends of the magnet 82 and the forwardly extending arms 84 of the flux collector 79. The rearwardly extending peripheral wall 85 of the speed cup 75 is positioned within the gaps directly adjacent to the ends of the magnet 82 and the arms 84 of the collector 79. By the use of the compensator 81 a change in temperature does not change the true reading of the speedometer. The rotation of the shaft 29 rotates the magnet 82 and the flux linkage between the ends of the magnet and the collector exerts a drag on the speed cup 75 which is proportional to the speed of rotation of the magnet for positioning the finger or needle pointer 23 along the dial plate 16. The adjustable spring 72 resists this movement and returns the pointer 23 to zero position when the shaft 29 is no longer driven. A stop finger 80 on the attached portion of the dial plate 16 is engaged by the finger at the zero position. The finger 23 has a sleeve 86 which extends over the pointer supporting end 73 of the shaft 63 in frictional engagement therewith.

In FIGS. 9 and 10, a further form of the invention is illustrated wherein a sleeve 87 is substituted for the sleeve 41 of FIGS. 1 to 8. The upper end of the sleeve 87 has cap 88 similar to the cap 49 formed in unit relation therewith providing the inwardly extending flange 48 which engages the recess 47 in the drive shaft 29. The cap 88 has the peripheral wall diametrically slotted at 89 to permit the outward movement of the flanges 48 when the shaft 29 is moved downwardly thereover. The flanges 53 are provided on the end of the cap 88 in the same manner as that described above with regard to the cap 49 of FIGS. 4 and 5. With this arrangement the apertures 46 preferably extend outwardly of the frame 12 so they can be employed to guide the reamer when reaming the sleeve 87 from the end opposite to that having the cap 88 thereon. It will be noted that a section of the flange 48 is omitted at 91 adjacent to the slots 89 to limit the amount of outward movement required to permit the shaft to pass thereby.

In FIG. 11, a further form of sleeve 92 is illustrated, that having a continuous cap 93 with the flanges 53 at the end thereof. The opposite end has an annular inwardly extending flange 94. The inner surface of the sleeve 92 is reamed in a manner as pointed out hereinabove from the end having the cap 93 adjacent to the inwardly extending flange 94. A drive shaft 95 has an annular recess 96 adjacent to the driving end. After the reaming operation, the sleeve 92 is removed from the aperture 39 and the shaft 95 is insered therein to permit the flange 94 to expand and enter the recess 96 after which the assembly is reinserted in the aperture 39. The flange 94 not only prevents the endwise movement of the shaft 95 but also provides an effective seal against the grease from the sheath of the drive member from passing upwardly about the shaft 95.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:
1. In a mechanism for converting rotational speed to a signal having a magnitude which is a function of the rotational speed, a frame assembly, a drive shaft which is adapted to be rotated relative to said frame assembly, a driven shaft supported at one end from and rotatable through an angle relative to said frame assembly, the magnitude of the angular rotation being a function of the speed of rotation of the drive shaft, a speed cup carried on the driven shaft, means for coupling said drive shaft to said driven shaft in a concentric in-line relation and supporting said driven shaft for angular movement relative to said frame assembly including a molded sleeve, and a magnet carried on said molded sleeve and cooperating with said speed cup, said molded sleeve having a first molded surface forming a first aperture in close fitting relation with an end of said drive shaft and a second surface forming a second aperture concentrically molded in communicating relation with said first aperture and in close fitting relation with the other end of said driven shaft, said first and second surfaces being part of an integrally molded unit.

2. In the mechanism of claim 1 wherein said end of said drive shaft is connected in driving relation with said molded sleeve.

3. In the mechanism of claim 1 wherein said end of said driven shaft is supported in said second aperture rotatably relative to said molded sleeve.

4. In the mechanism of claim 1 wherein said end of said drive shaft is connected in driven relation with said molded sleeve and said end of said driven shaft is supported in said second aperture rotatably relative to said molded sleeve.

5. In the mechanism of claim 1 wherein said drive shaft includes a recess and further including a member securable to said frame assembly against rotation having an inwardly extending flange which is sealingly and rotatably engageable in said recess to prevent the axial displacement of said shaft.

6. In a speedometer, a frame having two extending spaced apart arms on one side of a base and a projection for a drive on the opposite side of the base, said projection containing an aperture,
 a drive shaft within said aperture having means at one end connectible to a drive member and an annular recess at the opposite end,
 a member securable to said frame against rotation and having an inwardly extending flexible flange which is engageable in the recess of the drive shaft to prevent axial displacement thereof,
 a coupling element having
  a large aperture in one end in driving engagement with the end of the drive shaft adjacent to said flange,
  a second aperture at the other end thereof and a small aperture communicating with and of lesser diameter than said first and second apertures,
 a magnet fixed to the end of said coupling element opposite the end secured to the drive shaft,
 a driven shaft within said second aperture and having a projecting end which extends through said small aperture and a peripheral recess at the opposite end,
 a plate secured to the ends of said frame arms and having an aperture therein aligned with said small aperture in said coupling element,
 and a sleeve in said plate aperture having an inwardly projecting flexible flange which extends within the recess of the driven shaft for preventing axial displacement thereof.

7. In a speedometer as recited in claim 6, wherein a spring supporting member is retained by the sleeve for rotation on said plate, and a spiral spring having one end secured to the driven shaft and the opposite end secured to the spring supporting member which is adjustable about the sleeve to vary the spring tension.

8. In a speedometer as recited in claim 7, wherein a speed cup is supported on the driven shaft with the periphery wall extending over the magnet closely adjacent to the ends thereof.

9. In a speedometer as recited in claim 8, wherein a flux collector is supported on said coupling element in alignment with the magnet and has end walls extending upwardly and spaced a short distance outwardly from the peripheral wall of the speed cup which operates in the gaps between the ends of the magnet and the collector end walls.

10. In a speedometer as recited in claim 6, wherein said securable member is a sleeve of plastic material located within the aperture of the drive projection, and means guiding on said frame from which the inner surface of the securable member is accurately reamed to reduced its wall thickness and have its center accurately located relative to the arms of the frame.

11. In a speedometer as recited in claim 10, wherein the frame securable member has a pair of oppositely disposed ears by which it is attached to the frame.

12. In a speedometer as recited in claim 6, wherein said coupling element has a worm thread thereon and the base of said frame has an aperture therein, a gear element driven from the worm thread on said coupling element and having a projection on each end by which it is journaled in the frame.

13. In a speedometer as recited in claim 12, wherein a second gear element has a worm wheel at one end driven from the first said gear element, and has a worm at the opposite end thereof, a projection at one end of said second gear element journaled in the frame, said plate having an arm extending therefrom containing a slot for receiving an annular recess in said second gear element, an odometer supported by said plate, and a gear on said odometer driven by the worm of said second gear element.

14. In a speedometer as recited in claim 13, wherein a dial plate is supported by said first plate having speed indicia thereon and a window through which the odometer is visible.

References Cited

UNITED STATES PATENTS

| 2,114,191 | 4/1938 | Le Fevre et al. | 73—519 |
| 2,348,071 | 5/1944 | Johnstone | 64—24 XR |
| 3,111,037 | 11/1963 | Wallis | 73——519 |
| 3,196,692 | 7/1965 | Jensen | 73—519 XR |
| 3,240,072 | 3/1966 | Holbrook | 73—519 XR |

JAMES J. GILL, Primary Examiner

U.S. Cl. X.R.

64—24